United States Patent [19]

Yamaga et al.

[11] Patent Number: 4,494,854

[45] Date of Patent: Jan. 22, 1985

[54] ENERGY SAVING CAMERA

[75] Inventors: Shigeru Yamaga, Tokyo; Masamichi Furukawa, Hamamatsu, both of Japan

[73] Assignee: Ricoh Company, Ltd., Tokyo, Japan

[21] Appl. No.: 525,805

[22] Filed: Aug. 24, 1983

Related U.S. Application Data

[63] Continuation of Ser. No. 282,073, Jul. 10, 1981, abandoned.

[30] Foreign Application Priority Data

Jul. 11, 1980 [JP] Japan .................................. 55-94838
Oct. 13, 1980 [JP] Japan ............................ 55-145557[U]

[51] Int. Cl.³ .................... G03B 7/26; G03B 17/02; H01M 10/44; H01L 31/04
[52] U.S. Cl. .................... 354/484; 354/288; 136/251; 136/243; 250/239; 320/2; 429/163; 206/333
[58] Field of Search .......... 354/22, 23 R, 202, 155, 354/60 R, 219, 288, 295, 354, 484; 136/251, 291, 293; 250/239; 320/2, 34; 323/284, 906; 429/163, 175, 178, 185; 206/328, 329, 333

[56] References Cited

U.S. PATENT DOCUMENTS

| | | | |
|---|---|---|---|
| 4,227,140 | 10/1980 | Nardella et al. | 320/2 |
| 4,231,807 | 11/1980 | Keeling et al. | 136/251 |
| 4,296,489 | 10/1981 | Mitsui | 323/906 X |
| 4,328,456 | 5/1982 | Suzuki et al. | 354/60 R X |

FOREIGN PATENT DOCUMENTS

2022474 11/1971 Fed. Rep. of Germany ... 354/22 X

*Primary Examiner*—William B. Perkey
*Attorney, Agent, or Firm*—Oblon, Fisher, Spivak, McClelland & Maier

[57] ABSTRACT

A camera having a photovoltaic cell such as a solar cell is provided. A power supply circuit of a camera comprises a solar battery, a second battery and a switch. If the second battery is a secondary battery, the switch is closed to connect the solar and second batteries in parallel. Otherwise, the switch is kept open to disconnect the solar battery from the second battery. A particular upper cover structure is provided for mounting a photovoltaic device without deteriorating the rigidity and loosing light-tightness.

15 Claims, 18 Drawing Figures

ENERGY SAVING CAMERA

This application is a continuation of Ser. No. 282,073, filed July 10, 1981, now abandoned.

BACKGROUND OF THE INVENTION

1. Field of the Invention

This invention relates to a photographic camera designed on the basis of energy saving consciousness. More in particular, this invention relates to an automatic camera in which a solar battery is used to supply power at least partly.

2. Description of the Prior Art

It is a current trend to use a photovoltaic element such as a solar battery comprised of an array of solar cells as a power source of an automatic camera, and several proposals have been made to incorporate such a solar battery into a camera. However, it is generally understood that use of a solar battery alone to meet all the power requirements of an automatic camera cannot be made without difficulty. For example, a considerably large amount of current is required to operate the shutter of a camera, and, therefore, a considerably large area must be reserved on the surface of a camera for solar cells if such a large current is to be supplied by a solar battary alone. Since the surface of a camera body is rather limited, only an insufficient area is available for a solar battery, which, in turn, requires to provide another power source. Accordingly, it has been common practice to use a secondary battery as well as a solar battery, thereby it is so structured that the secondary battery is charged by the solar battery and a required power is supplied to the control circuit of a camera from the secondary battery.

It is true that a secondary battery may be put in use for a longer period of time by recharging; however, the secondary battery also needs to be replaced once in a while from various reasons such as deterioration in performance due to aging and malfunctioning. Besides, what is rather problematical is that replacement of secondary batteries for use in a camera is not at user's disposal because they are simply not available in the market. Camera batteries which are available in the market are primary batteries which are not reversible, and, therefore, they cannot be recharged for a repetitive use. If an attempt is made to recharge a primary battery, gas will be produced inside the battery, resulting in an explosion in an extreme case.

It is also to be noted that the provision of a solar battery should not cause any inconveniences. For example, the upper cover of a camera body will be the most appropriate place to provide a solar battery. However, there are many moving and adjusting parts such as a film winding lever on top of the upper cover, a solar battery, when mounted, should not constitute an obstruction for the operator. Moreover, it is quite important that a solar battery be well protected, especially against external forces. Because, a solar battery is a kind of the components which are mounted to be of service for the life of a camera, and, therefore, replacement of solar batteries cannot usually be made without considerable difficulties.

SUMMARY OF THE INVENTION

The disadvantages of the prior art are overcome with the present invention and an improved automatic camera which uses a solar battery for the purpose of energy saving is provided.

In accordance with one aspect of the present invention, the power supply circuit of a camera includes a solar battery and a second battery which are connected in parallel each other through a switch whereby the switch is operated according to whether the second battery is a primary battery or a secondary battery. The switch is closed to connect the solar and second batteries when the second battery is a secondary, or rechargeable battery; whereas, the switch is made open to disconnect the solar battery from the second battery when the second battery is a primary, or non-rechargeable battery. Actuating means is provided to turn the switch on or off depending on whether the second battery installed in the camera is rechargeable or not. Such actuating means may preferably comprise a detection member movably mounted in the camera body and a contact member formed integrally with either one of primary or secondary batteries, thereby when that kind of the battery which has the contact member is installed in the camera, the detection member is brought into contact with the contact member to be shifted to operate the switch. Alternatively, the switch may be comprised of an electronic switch and the actuating means comprises a comparator which supplies differing outputs as inputs to the electronic switch depending on the type of batteries installed.

In accordance with another aspect of the present invention, an opening is provided in the upper cover of a camera body, and a solar battery assembly, comprised of solar cells and a housing which completely encloses the solar cells, is tightly fitted in the opening thereby the solar battery assembly forming a part of the upper cover. Preferably, the solar battery housing comprises an opaque receptacle, the bottom surface of which is provided with solar cells, and a transparent top cover which may be fixedly attached to the mouth of the receptacle. Therefore, light may pass through the transparent top cover and impinge upon the solar cells thereby converting the radiant energy of the light into electrical energy. This provides a light-tight and rigid structure even through the solar battery assembly is fittingly mounted in the opening of the upper cover. Moreover, the solar cells are prevented from receiving undesired external forces, thereby insuring a prolonged service life, and they do not hinder the operator from manipulating the camera in any manner.

In accordance with a further aspect of the present invention, use is made of a liquid crystal cell as an optical indicator in the viewfinder of a camera. Preferably, such a liquid crystal cell is disposed in the gap between a pentagonal prism and a focusing screen. With such a structure, all the mechanically moving parts such as a conventional exposure meter needle are eliminated, and energy requirements for activating the display device in the viewfinder are considerably relaxed, which enables to use a solar battery advantageously as a power source of a camera.

Therefore, it is an object of the present invention to provide an improved automatic camera of the energy saving type.

Another object of the present invention is to provide an improved camera provided with a power supply circuit which comprises a solar battery and a second battery, either of a rechargeable or non-rechargeable type, which are connected in parallel through a switch, whereby the switch is closed only if the second battery is rechargeable.

A further object of the present invention is to provide an improved camera, the upper cover of its camera body being provided with an opening into which a solar battery assembly is fittingly mounted.

A still further object of the present invention is to provide a camera having a viewfinder display device which includes a liquid crystal cell.

Other objects, advantages and novel features of the present invention will become apparent from the following detailed description of the invention when considered in conjunction with the accompanying drawings.

BRIEF DESCRIPTION OF THE DRAWINGS

FIGS. 3(A) and (B) show two different embodiments of the secondary battery to be used in the present invention;

DESCRIPTION OF THE PREFERRED EMBODIMENTS

Figure 1:
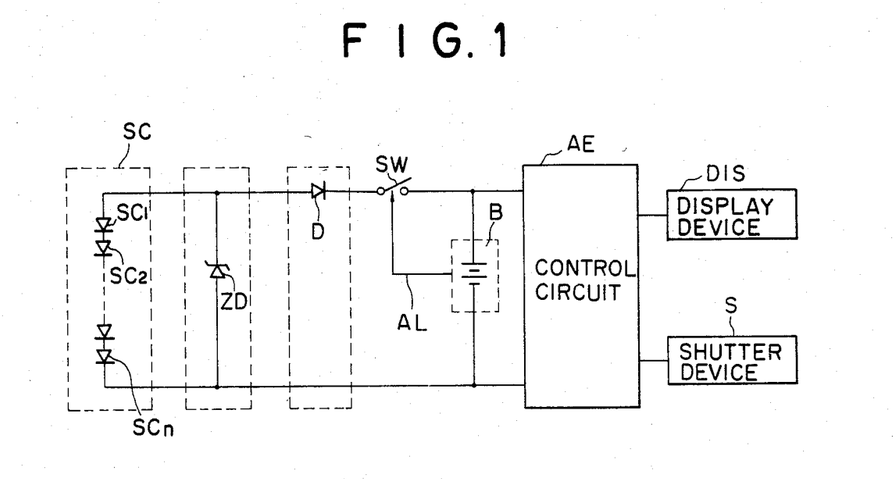
FIG. 1 is a circuit diagram, partly shown in blocks, which illustratively shows that the switch connecting the solar battery and the second battery is operated by the kind of the second battery in accordance with the present invention.

Referring now to FIG. 1, there is shown a circuit diagram embodying the present invention, which includes a solar battery SC, comprised of an array of solar cells $SC_1$, $SC_2$, . . . , $SC_n$. A Zener diode ZD is connected in parallel to the solar battery SC to regulate the output voltage of the solar battery SC to be constant. The positive terminal of the solar battery SC is connected to the anode of a diode D, the cathode of which is connected to the positive terminal of a second battery B through a switch SW. On the other hand, the negative terminal of the solar battery SC is connected to the negative terminal of the second battery B.

As shown by the line AL in FIG. 1, the switch SW is operated to be open or closed in accordance with the kind of the second battery B, i.e., depending on whether it is rechargeable or not. That is, the switch SW is closed when the battery B is a secondary, or rechargeable battery; whereas, the switch SW is kept open when the battery B is a primary, or non-rechargeable battery. It is to be noted that the switch SW may be operated manually, if desired, but, preferably, actuating means is provided to automatically turn the switch SW on or off as will be fully described later. The battery B is further connected to a display device DIS and a shutter device S through a control circuit AE.

Figure 2:
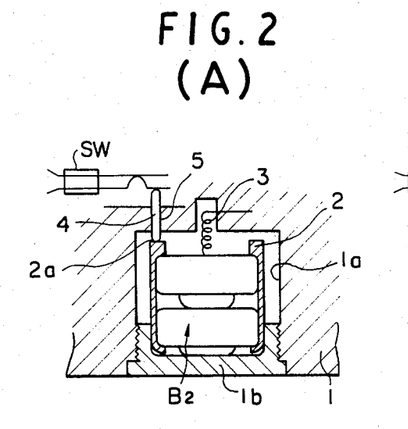
FIG. 2(A) shows the condition in which the switch SW is closed owing the installment of a secondary battery.
FIG. 2(B) shows the condition in which the switch SW is kept open owing to the installment of a primary battery.

FIGS. 2(A) and (B) show one embodiment of the actuating means to operate the switch SW depending upon the kind of the second batteries B installed in the camera body. FIG. 2(A) shows the case when the secondary battery is installed; whereas, FIG. 2(B) shows the case when the primary battery is installed. As shown in FIG. 2(A), the camera body 1 is provided with a battery chamber 1a in which the second battery B may be installed to form a part of the power supply circuit of the camera. The secondary battery $B_2$ includes a pair of secondary battery cells which are connected in series. As shown, the battery $B_2$ is housed in a package 2 which has a contact surface 2a defined at a predetermined position of the package 2.

When installing, the battery $B_2$ is placed into the chamber 1a against the force of a spring 3, which also functions as a negative connection lead, and a lid 1b is screwed into the threaded portion of the chamber 1a, thereby the battery $B_2$ is placed in position inside the chamber 1a. A detection member 4 is slidably fitted in a hole 5 provided in the camera body 1. And, therefore, when the battery $B_2$ is placed in position, the contact surface 2a of the package 2 abuts against the bottom end of the detection member 4 and the member 4 is shifted upward to turn the switch SW on. On the other hand, if primary battery cells $B_1$, which are available in the market and not rechargeable, are installed as shown in FIG. 2(B), the detection member 4 is not shifted upward, and, therefore, the switch SW is kept open.

Figure 3:
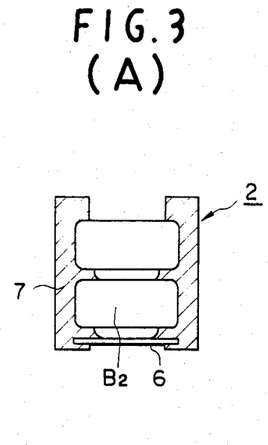

FIGS. 3(A) and (B) show two different embodiments of the package 2 for the secondary battery cells $B_2$. In FIG. 3(A), the package 2 comprises a conductive plate 6, which is in contact with the negative electrode of the bottom cell, and a resin cylinder 7 is formed by molding arround the battery cells $B_2$. This embodiment is particularly useful because liquid leakage from the cells is effectively prevented by minimizing the exposed surface. FIG. 3(B) shows the other embodiment in which the lid 1b of the battery chamber 1a is integrally formed as a part of the package 2. Thus, the package 2 of this embodiment has a threaded portion 8 which may be screwed into the threaded portion of the battery chamber 1a. The height A of this threaded portion 8 may be advantageously used to close the switch SW. A fixing member 9 of insulating material is provided at the mouth of the package 2 to keep the battery cells B₂ in place.

Figure 4:
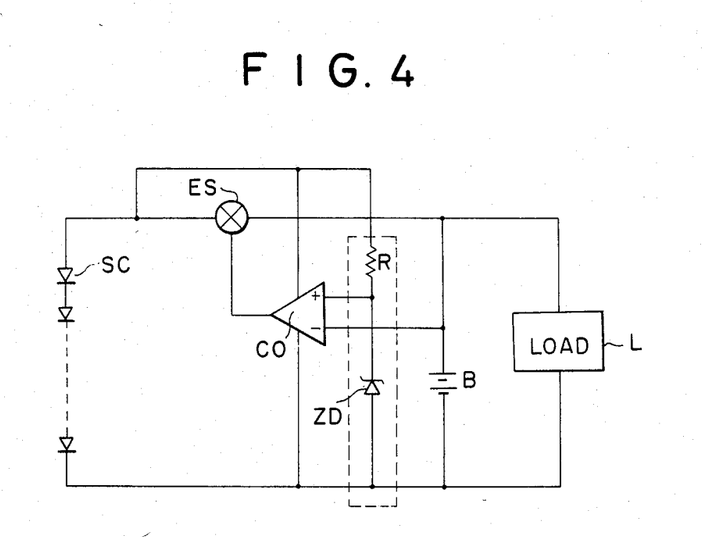
FIG. 4 is a circuit diagram showing another embodiment of the present invention which carries out the required switching operation electronically.

FIG. 4 shows another embodiment of the present invention, which is designed on the basis of the fact that the nicad battery, most commonly used as a secondary battery, has an output voltage which is different from the output voltage of the silver-cadmium battery and the alkaline-manganese battery, which are commonly used as primary batteries. That is, the output voltage of the nicad battery is 1.3 volts; whereas, the silver-cadmium and alkaline-manganese batteries have the output voltage of 1.5 volts. As shown in FIG. 4, a series circuit comprised of a resistor R and a Zener diode ZD is connected in parallel to the solar battery SC to produce a reference voltage at the node between the resistor R and the diode ZD. The reference voltage thus produced is supplied to one input terminal of a comparator CO and the output voltage of the battery B is supplied to the other input terminal of the comparator CO whereby a comparison is made between the reference voltage and the output voltage of the battery B. An output signal from the comparator CO is supplied to an electronic switch ES thereby the switch ES is closed to connect the solar battery to the second battery B if the battery B is a secondary battery; on the other hand, the switch ES is turned open to disconnect the solar battery SC from the second battery if the battery B is a primary battery. Now, care must be exercised in using the embodiment shown in FIG. 4. For example, a sufficient amount of light must impinge upon the solar battery SC since the output of the solar battery SC is used to produce the reference voltage.

Now, description will be had as to a structure of mounting a photovoltaic device such as a solar battery device on a camera body.

Figure 5:
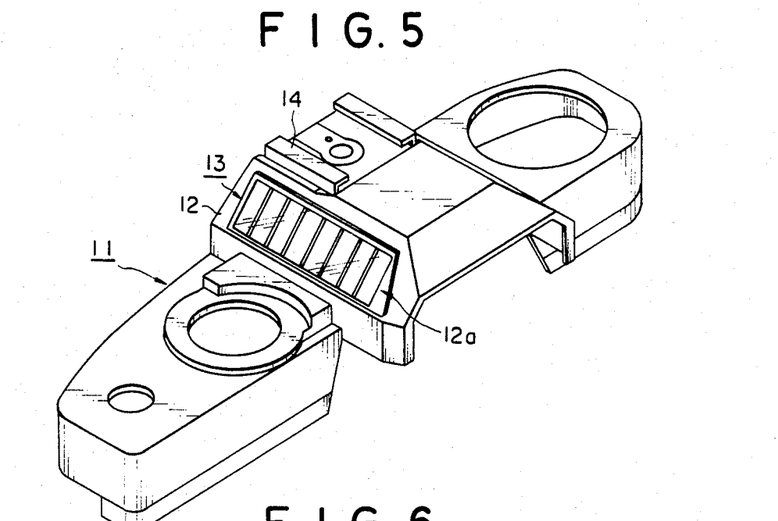
FIG. 5 is a perspective view of the upper cover of a camera body having the solar battery assembly in accordance with the present invention.
Figure 6:
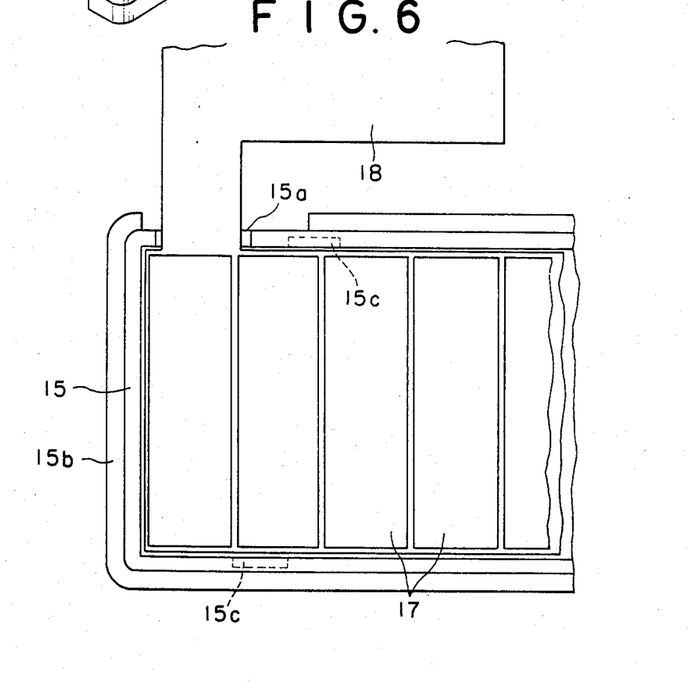
FIG. 6 is a partial plan view of the solar battery assembly fittingly mounted in the opening of the upper cover shown in FIG. 5.
Figure 7:
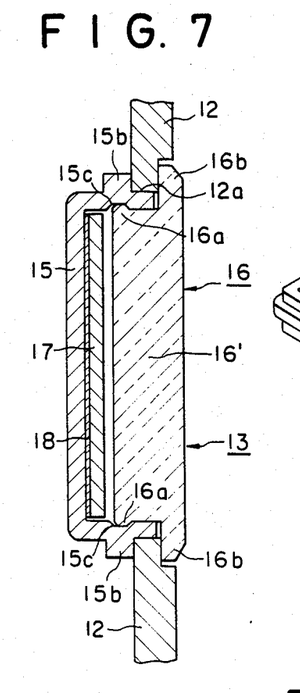
FIG. 7 is a cross-sectional view of the solar battery assembly shown as mounted in the opening of the upper cover.
Figure 9:
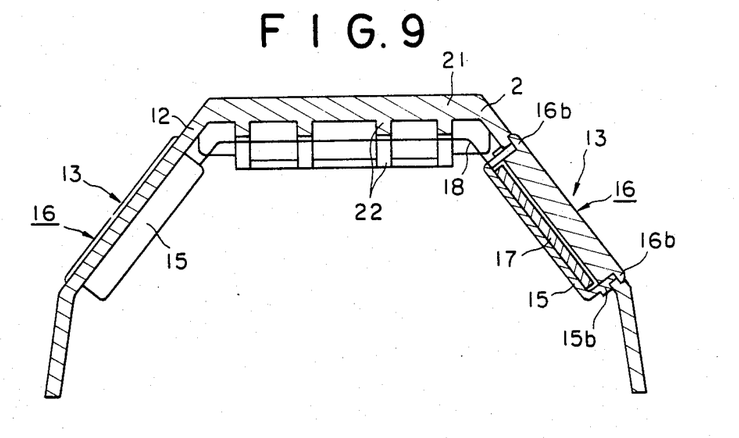
FIG. 9 is a cross-sectional view of that portion of the upper cover which is located above the pentagonal prism with a pair of solar battery assemblies mounted in the sloped sides of the upper cover.

FIG. 5 shows an upper cover 11 constituting a part of the camera body of a single-reflex type camera. As shown, a sloped section 12 of that portion of the upper cover 11 which encloses a pentagonal prism is provided with a photovoltaic device 13. It is to be noted, as best shown in FIG. 9, that a pair of sloped sections 12 is symmetrically formed in an opposed relationship and the photovoltaic device 13 is provided in each of these sloped sections 12. The photovoltaic device 13 is tightly fitted in an opening 12a provided in the sloped section 12. Such an opening 12a should be made as large as possible so that a photovoltaic device 13 having a large light-receiving area may be mounted. The larger the area of the opening 12a, the weaker the mechanical strength of the upper cover 11. Accordingly, when an external force is applied to that portion of the upper cover 11 which encloses a pentagonal prism, for example, by attaching to or detaching a stroboflasher (not shown) from an accessary shoe 14, the upper cover 11 is susceptible to deformation and/or breakage, and, therefore, a gap may be formed between the upper cover 11 and the photovoltaic device 13 thereby destroying light-tightness. With the foregoing in mind, the present invention proposes an improved and novel structure in mounting the photovoltaic device 13 on the upper cover 11.

Referring to FIGS. 6 through 9, the photovoltaic device 13 comprises a receptacle 15, made of an opaque material, for receiving therein photovoltaic elements 17 such as solar cells and a transparent top cover 16, which may be attached to the mouth of the receptacle 15 thereby completely enclosing the photovoltaic elements 17. The receptacle 15 is generally in the form of a tray having a rectangular shape, and a plurality of photovoltaic elements 17 such as solar cells are fixedly mounted on the inside bottom surface of the receptacle 15.

Figure 8:
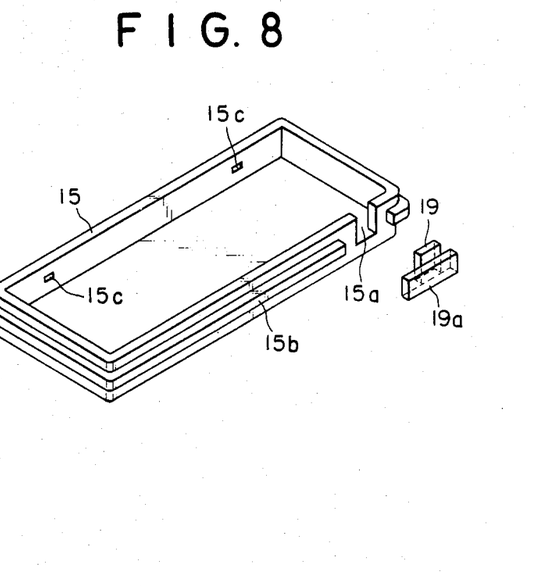
FIG. 8 is an exploded view in perspective of the receptacle which constitutes a part of the solar battery assembly and in which solar cells are received.

These photovoltaic elements 17 are arranged side-by-side in a line and the voltage produced by each of the elements 17 is taken out by a flexible printed circuit board 18. The receptacle 15 is provided with a recess 15a through which a portion of the board 18 extends out, and a ridge 15b is provided on the outer surface of the side wall of the receptacle 15 except where the recess 15a is formed. As best shown in FIG. 8, there is provided a plug member 19 which snugly fits into the recess 15a thereby a connecting ridge 19a integrally formed on one surface of the plug member 19 fills the void space of the ridge 15b. Depressions 15c are appropriately formed in the inside surface of the side wall of the receptacle 15. On the other hand, the transparent top cover 16 has a body section 16' which fits into the receptacle 15, and protuberances 16a are formed on the body section 16' so that the relative positional relationship between the receptacle 15 and the top cover 16 is determined when the protuberances 16a are fitted in the corresponding depressions 15c. The top cover 16 also has a projection 16b which laterally extends from the body section 16'.

Now, it will be explained as to a manner of assembling the photovoltaic device 13 into the upper cover 11. First, the receptacle 15 is fitted into the opening 12a of the upper cover 11 from the interior side with the ridge 15b abutting against the sloped side 12 at the periphery of the opening 12a. Then, the top cover 16 is fitted into the receptacle 15 from the exterior side of the upper cover 11 thereby having the protuberances 16a fitted into the corresponding depressions 15c with the use of elasticity of the receptacle 15 and the top cover 16. Thus, the photovoltaic device 13 is assembled and mounted in the opening 12a of the upper cover 11 since the ridge 15b of the receptacle 15 and the projection 16b of the top cover 16 securely hold the sloped side 12 at the periphery of the opening 12a from opposite sides. If desired, adhesive agent may be applied at the contact surfaces between the upper cover 11 and the receptacle 15 and between the upper cover 11 and the top cover 16.

With such a structure as described above, since the opening 12a is plugged by the receptacle 15 and the top cover 16 with the sloped side 12 sandwiched between the ridge 15b and the projection 16b under pressure, the mechanical strength of the upper cover 11 which has been weakened by providing the opening 12a is compensated by the receptacle 15 and the top cover 16 thereby preventing the occurrence of deformation and breakage of the upper cover 11. It should also be noted that the above structure gives an excellent light-tightness since the ridge 15b is in pressure contact with the sloped side at the periphery of the opening 12a. It will also be easily understood that an external force applied to the upper cover 11, especially to that portion of the upper cover 11 which encloses a pentagonal prism, is prevented from being transferred to the photovoltaic elements 17. Preferably, the photovoltaic devices 13 are electrically connected to each other through the printed circuit board 18 and they are commonly connected as a power source to the electric circuit of a camera.

Figure 10:
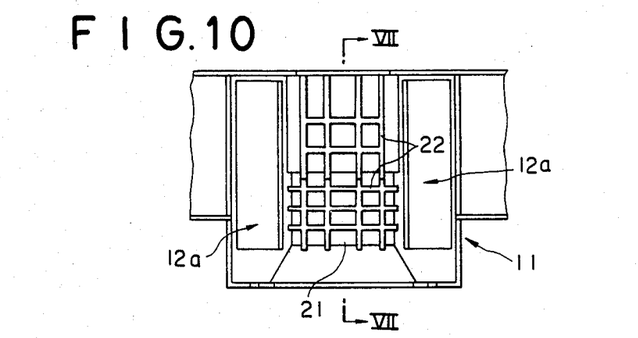
FIG. 10 is a bottom view of the top flat portion of the upper cover shown in FIG. 9.
Figure 11:
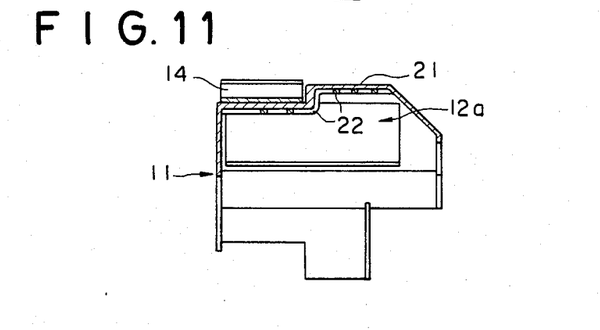
FIG. 11 is a cross-sectional view taken along VII—VII line shown in FIG. 10.

As shown in FIGS. 9 through 11, on the inside surface of a roof section 21 of the upper cover 11 are provided ribs 22 in the form of a grid. This rib structure adds rigidity to the upper cover 11 thereby additionally compensating the loss of mechanical strength caused by providing the opening 12a.

Figures 12, 13:
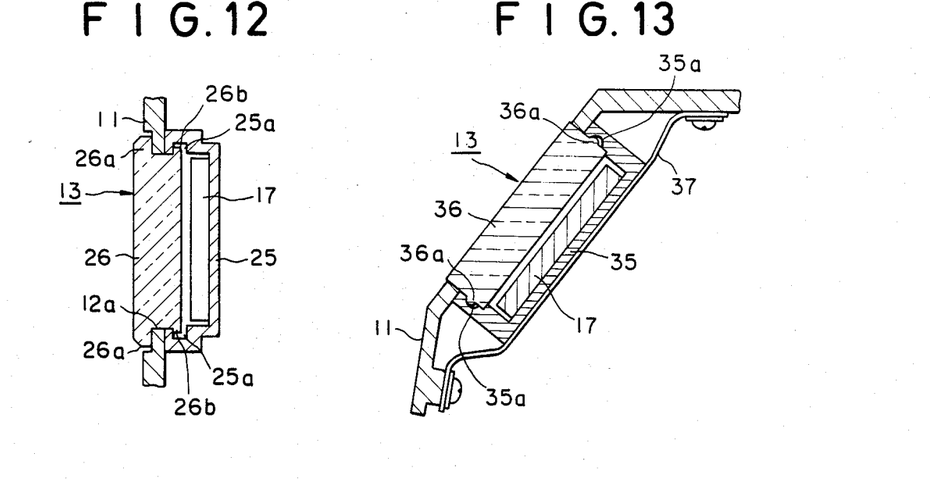
FIG. 12 is a cross-sectional view showing another embodiment of the solar battery assembly in accordance with the present invention.
FIG. 13 is a cross-sectional view showing a further embodiment of the solar battery assembly in accordance with the present invention.

Alternative embodiments in mounting the photovoltaic device 13 onto the upper cover 11 are shown in FIGS. 12 and 13. Referring first to FIG. 12, the top cover 26 is provided with the ridge 26a and protuberances 26b, and the receptacle 25 is provided with the depressions 25a into which the corresponding protuberances 26b may be fitted. Thus, in assembling the top cover 26 is first inserted into the opening 12a of the upper cover 11 from the exterior side thereof, and, thereafter, the receptacle 25 is pressed against the thus inserted top cover 26 from the interior side of the upper cover 11 to bring the protuberances 26b in engagement with the depressions 25a. With the above structure, the opening 12a of the upper cover 11 is plugged by the top cover 26 to compensate the loss of rigidity and an external force applied to the upper cover 11 is effectively prevented from being transferred to the photovoltaic elements 17. Besides, since the mouth portion of the receptacle 25 is in pressure contact with the upper cover 11, desired light-tightness is attained and no light will pass through the upper cover 11.

Referring now to FIG. 13, it should be noted that a ridge is provided on neither of the opaque receptacle 35 and the transparent top cover 36. Depressions 35a are appropriately formed in the inside surface of the side wall of the receptacle 35 and the corresponding protuberances 36a are provided on the top cover 36. In assembling, the top cover 36 is first inserted into the opening of the upper cover 11, and, then, the receptacle 35 is fitted onto the thus inserted top cover 36 from the interior side of the upper cover 11 to bring the depressions 35a into engagement with the corresponding protuberances 36a. Under the condition, the receptacle 35 and the top cover 36, which are combined together through the engagement between the protuberances 36a and the depressions 35a, will not pass through the opening of the upper cover 11 to the exterior side thereof because the mouth end of the receptacle 35 abuts against the inside surface of the upper cover 11.

Then a holding plate 37 is placed in contact with the back of the receptacle 35 with its both ends fixed to the inside surface of the upper cover 11 by fixing means such as screws so that a combination of the receptacle 35 and the top cover 36 is prevented from falling off from the top cover 11 into the interior thereof. With such a structure, the opening of the upper cover 11 is plugged by the top cover 36 to give a required mechanical strength and the contact between the mouth end of the side wall of the receptacle 35 and the inside surface of the upper cover 11 gives an excellent light-shield. It will also be appreciated that an external force is prevented from being transferred to the photovoltaic cells 17 partly due to the provision of the holding plate 37.

Figure 14:
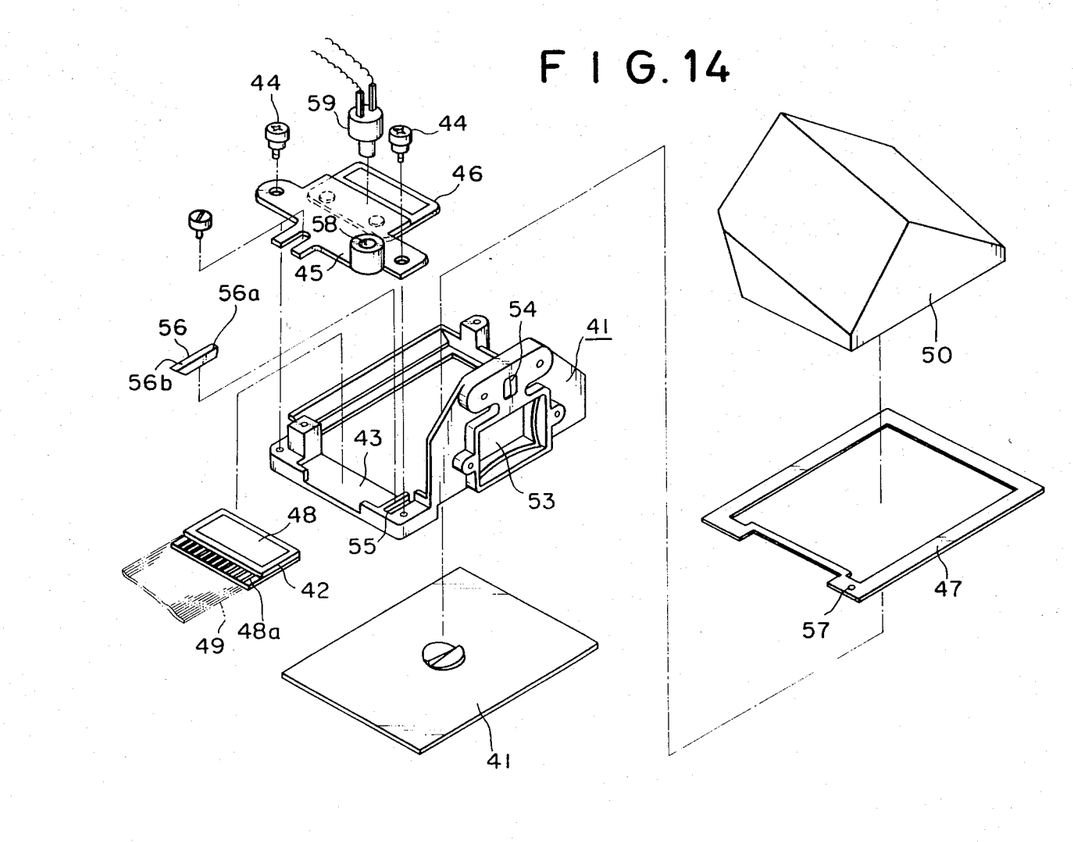
FIG. 14 is an exploded view of the viewfinder section of a camera in accordance with the present invention.
Figure 15:
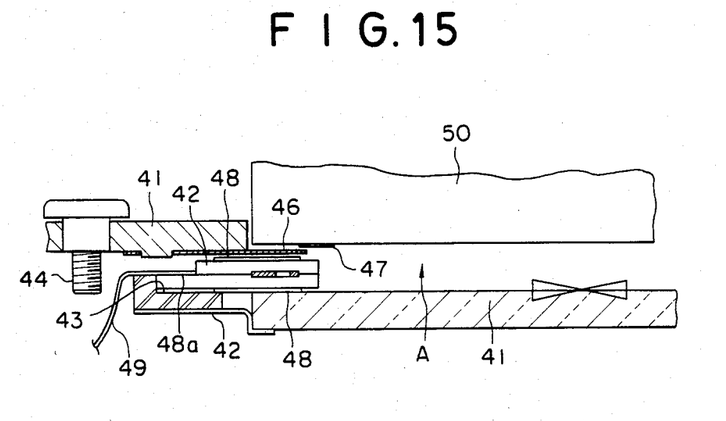
FIG. 15 is a cross-sectional view taken vertically when the components shown in FIG. 14 are assembled.
Figure 16:
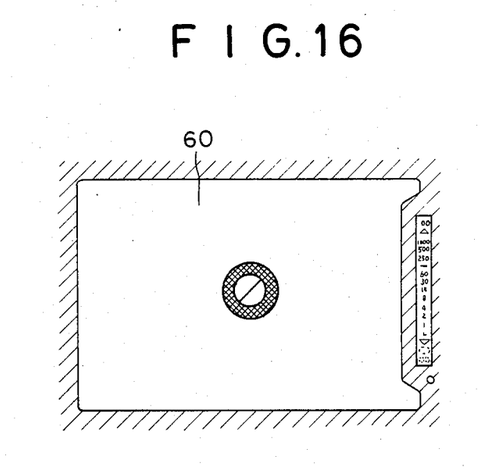
FIG. 16 is a front view of the viewfinder as viewed by the operator in accordance with the present invention.

Reference will now be made to FIGS. 14 through 16 which show the viewfinder section of a camera in accordance with the present invention. As will be clearly understood from the following description, the present invention proposes to provide a liquid crystal cell as a light source to show a marking on a display plate in the viewfinder. Therefore, in the present invention, no moving part such as a meter needle exists and power requirement is relaxed since use of LED's may be avoided as much as possible. However, since a liquid crystal cell usually has a thickness of around 1.5–2.0 mm, ingenuity is required in disposing such a liquid crystal cell.

In accordance with the present invention, there is provided a viewfinder display device into which a liquid crystal cell may be incorporated, keeping the conventional viewfinder optical system including a focusing screen intact. Stated briefly, the present invention proposes to dispose a liquid crystal cell in the gap between the pentagonal prism and the focusing screen of the viewfinder optics. More in detail, referring to FIG. 14, a prism frame 41 has a table section 43 on which a liquid crystal cell 42 is to be placed. A display plate 46 is attached to a display plate mounting plate 45 which may be adjustably fixed to the frame 41 by means of screws 44. Thus, when assembled, the display plate 46 is located above the liquid crystal cell 42, and a portion of the outside edge of a field mask 47 will abut against the side edge of the display plate 46.

Deflection plates 48 are attached to the top and bottom surfaces of the liquid crystal cell 42. Electrodes 48a extend from the deflection plates 48 and a conductive plate 49 such as a heat seal is connected to the electrodes 48a by pressure contact or fusing. A pentagonal prism 50 may be fixed to the frame 41 as well known in the art. A focusing screen 41 is fixedly held in alignment with the frame 41 and the prism 50 by supporting plates 42. Thus, it will now be understood that the liquid crystal cell 42 with the deflection plates 48 attached on the opposite surfaces thereof and the display plate 46 are all disposed in a gap A defined between the bottom surface of the prism 50 and the top surface of the focusing screen 41.

The frame 41 also includes an eyepiece mounting section 53, a light-receiving element mounting section 54, and a flasher charge indicator groove 55. A trapezoidal prism 56 may be fitted into the groove 55. Correspondingly, the mask 47 includes a flasher charge-up indicating section 57 which comes into alignment with a reflecting surface 56a of the prism 56 when assembled. On the other hand, when assembled, a hole 58 of the mounting plate 45 becomes located immediately above the other end surface 56b of the prism 56 and a light emitting diode 59 is inserted in the hole 58. Use is made of a light emitting diode to indicate the flasher charge-up condition since it is usually in a dark place when a flasher is to be used.

Contents of the display may vary adcording to the structure of a camera, but they may include a shutter speed at an appropriate exposure, an iris value, battery check indication, bulb indication sign, manual indication sign, memory-hold sign, exposure correction sign, in-focus sign, etc. As shown in FIG. 16, the location of display is defined along one side of a field of view 60 in the viewfinder section. The above-mentioned contents are displayed such that signals are applied to the deflection plates 48 through the conductive plate 49. On the other hand, the flasher charge-up condition is indicated by the activation of the light emitting diode 59.

As described above, in accordance with the present invention, various information may be displayed in the viewfinder without requiring substantial power. Besides, no moving part is provided in the viewfinder so that mechanical failure due to shocks is completely eliminated and an excellent air-tightness is provided thereby preventing the intrusion of dust and debris. Furthermore, the present invention provides a structure in which a liquid crystal cell may be incorporated into the viewfinder section without changing the conventional viewfinder optics, which is particularly useful in manufacture.

While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A power supply circuit of a camera having a camera body provided with a battery chamber for supplying an electric power to a control circuit of said camera for carrying out at least a part of the photographic operation, comprising:
   a solar battery;
   a second battery removably provided in said chamber to be electrically connectable to said control circuit, said second battery being a selected one of either a primary battery or a second battery;
   means for indicating said second battery to be a secondary battery when said second battery is a secondary battery;
   connection means for electrically connecting said solar battery and second battery in parallel;
   switch means provided in said connection means for connecting said solar battery to or disconnecting said solar battery from said second battery through said connection means; and
   detecting means for detecting whether said battery is a primary battery or a secondary battery based on said means for indicating when said battery is removably provided in said battery chamber in position, said detecting means causing said switch means to connect said solar battery to said second battery through said connection means only when said second battery is detected to be a secondary battery due to presence of said means for indicating, said detecting means causing said switch means to maintain said solar battery disconnected from said second battery when said second battery is detected to be a primary battery due to the presence of said means for indicating.

2. The power supply circuit of claim 1 wherein said switch means is an electronic switch and said means for indicating is a particular output voltage of said second battery, which supplies a first output voltage when it is a primary battery and a second output voltage different in level from said first voltage when it is a secondary battery, and wherein said detecting means includes:
   means for generating a reference voltage; and
   comparator means having a first input connected to said means for generating a reference voltage, a second input connected to one terminal of said second battery, and an output terminal connected to said electronic switch, said comparator means supplying an output signal only in response to said second output voltage to said electronic switch thereby causing said electronic switch to connect said solar battery to said second battery through said connection means.

3. The power supply circuit of claim 1 wherein said detecting means includes a detection member movably provided in the body of said camera with its part extending into said battery chamber and said means for indicating includes a housing for housing therein said second battery which is a secondary battery, said housing including a contact surface which may be brought into contact with said detection member to cause said switch means to connect said solar battery to said second battery through said connection means when said second battery is installed in said battery chamber.

4. The power supply circuit of claim 1 further comprising a Zener diode connected in parallel with said solar battery to regulate its output voltage.

5. The power supply circuit of claim 1 further comprising a diode connected between said solar battery and second battery for preventing the reverse current from said second battery to said solar battery.

6. An upper cover of a camera having a photovoltaic device for supplying power to carry out at least a part of the photographic operation, said upper cover being provided with an opening for snugly fitting therein said photovoltaic device which comprises an opaque receptacle for receiving therein a plurality of photovoltaic elements, a transparent top cover for covering said receptacle, first holding means for holding said photovoltaic device, said first holding means including a ridge provided on said receptacle and a projection provided on said top cover whereby said ridge and said projection holds said top cover at the periphery of said opening, and second holding means for holding said receptacle and said top cover together.

7. An upper cover of claim 6, wherein said second holding means includes protuberances formed on either one of said top cover or said receptacle and depressions correspondingly formed on the other of said top cover or said receptacle whereby said protuberances are fitted in said depressions to combine said top cover from said receptacle.

8. An upper cover of a camera having a photovoltaic device for supplying power to carry out at least a part of the photographic operation, said upper cover being provided with an opening for snugly fitting therein said photovoltaic device which comprises an opaque receptacle for receiving therein a plurality of photovoltaic elements, a transparent top cover for covering said receptacle, first holding means for holding said photovoltaic device, said first holding means including a holding plate which abuts against the back side of said photovoltaic device and both ends of which are fixedly attached to the inside surface of said upper cover, and second holding means for holding said receptacle and said top cover together.

9. An upper cover of claim 8, wherein said second holding means includes protuberances formed on either one of said top cover or said receptacle and depressions correspondingly formed on the other of said top cover or said receptacle whereby said protuberances are fitted in said depressions to combine said top cover from said receptacle.

10. An upper cover of a camera provided with a photovoltaic device for supplying power to carry out at least a part of the photographic operation, said upper cover having a pair of sloped sections symmetrically arranged in an opposed relationship and a roof section connecting the top ends of said pair of sloped sections to enclose a pentagonal prism of said camera, at least either one of said sloped sections being provided with an opening for snugly fitting therein said photovoltaic device which comprises an opaque receptacle for receiving therein a plurality of photovoltaic elements, a transparent top cover for covering said receptacle, first holding means for holding said photovoltaic device and second holding means for holding said receptacle and said top cover together, and said roof section including ribs provided on the inside surface thereof in order to increase the mechanical strength of said upper cover.

11. An upper cover of claim 10 wherein said ribs are provided in the form of a grid.

12. An upper cover of claim 10 wherein said first holding means includes a ridge provided on said receptacle and a projection provided on said top cover whereby said ridge and said projection hold said top cover at the periphery of said opening.

13. An upper cover of claim 12 wherein said second holding means includes protuberances formed on said top cover and depressions correspondingly formed on said receptacle whereby said protuberances are fitted in said depressions to combine said top cover with said receptacle.

14. An upper cover of claim 10, wherein said first holding means includes a holding plate which abuts against the back side of said photovoltaic device and both ends of which are fixedly attached to the inside surface of said upper cover.

15. An upper cover of claim 14 wherein said second holding means includes protuberances formed on said top cover and depressions correspondingly formed on said receptacle whereby said protuberances are fitted in said depressions to combine said top cover with said receptacle.

\* \* \* \* \*